March 22, 1966  B. McCOLLUM  3,242,459
SEISMIC WAVE RADIATOR
Filed Feb. 11, 1963  2 Sheets-Sheet 1

Burton McCollum
INVENTOR.

BY Bertram A. Mann
ATTORNEY

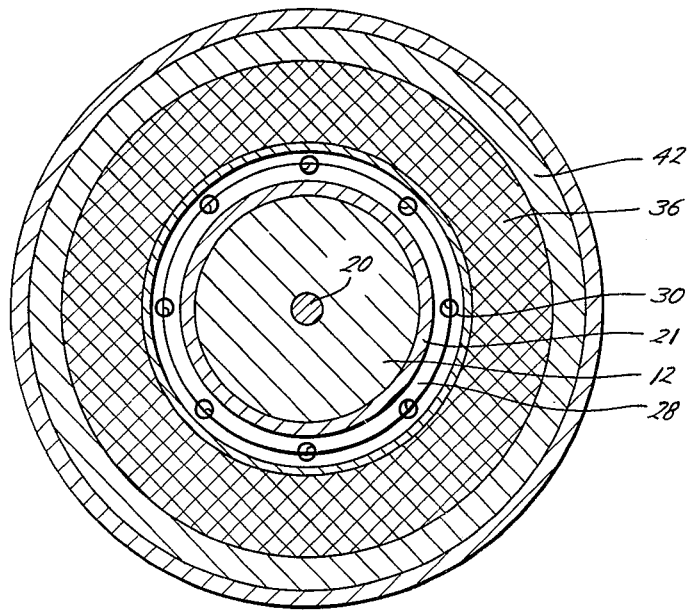
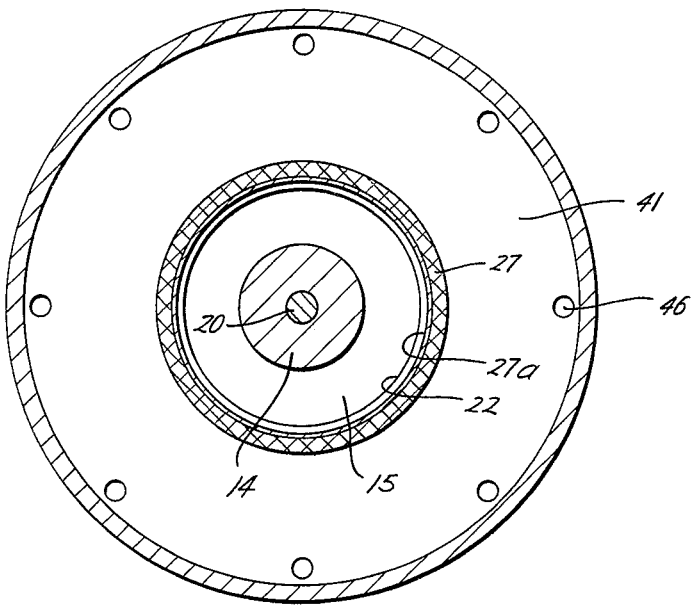
Burton McCollum
INVENTOR.
BY Bertram H. Mann
ATTORNEY

United States Patent Office 3,242,459
Patented Mar. 22, 1966

3,242,459
SEISMIC WAVE RADIATOR
Burton McCollum, Houston, Tex.; F. R. Rowe and Bank of the Southwest National Association, Houston, Tex., executors of Burton McCollum, deceased
Filed Feb. 11, 1963, Ser. No. 257,457
10 Claims. (Cl. 340—17)

This invention relates to transducer devices for radiating signals in the earth in seismic explorations.

In the radiation of seismic waves for the purpose of exploring subsurface geology, it has often been found desirable to use some form of mechanical vibrator for actuating the radiator element. Various types of electrodynamic drives have been provided and such a drive is particularly desirable for radiating distinctive and predictable wave trains to implement the method of seismic exploration disclosed, for instance, in my co-pending application entitled Techniques for Improving Seismic Records, Serial No. 315,620 filed October 11, 1963. However, as heretofore used electrodynamic methods of driving the radiator element have operated at very low efficiency. The chief reason for this is that the radiator element, being always in firm contact with the earth, can move through only very small displacements and the electromagnetic driving element coupled to the radiator will be similarly restricted. However, electrodynamic devices, in order to function efficiently must, for well known reasons, move at high velocities. The velocity of any vibrating member is given by the expression $$V = a \sin 2\pi ft$$

where $a$ is the maximum amplitude of the vibration and $f$ is the frequency. Because of the well known high absorption of seismic waves at high frequencies, it has been necessary to use low values of the frequency, usually below 100 cycles per second, and at these low frequencies the velocity V is very small.

As a result of this low velocity and the necessarily small movement $a$ of the radiator, the radiation efficiency of conventional electrodynamic drives is very low, usually being of the order of less than one per cent. Further, electrodynamic drives as heretofore used have large values of inductance which further reduce their efficiency, and introduce large phase shifts between current and voltage. These factors are particularly objectionable if the electrodynamic drive is used to implement my invention, as above referred to.

My present invention avoids all of these objectionable limitations, first by coupling the electrical driving element to the radiator element in such manner that the former travels at many times higher velocity than the latter, and second, by so designing the electrical system that it is virtually noninductive. These objectives can be accomplished by a number of different means, one of which is described in the annexed specification, reference being made to the accompanying drawings in which, FIG. 1 is a longitudinal center section through an exemplary form of the novel radiator;

FIG. 2 is a transverse section taken substantially on line 2—2 of FIG. 1; and

FIG. 3 is a transverse section taken on line 3—3 of FIG. 1.

Figure 1:
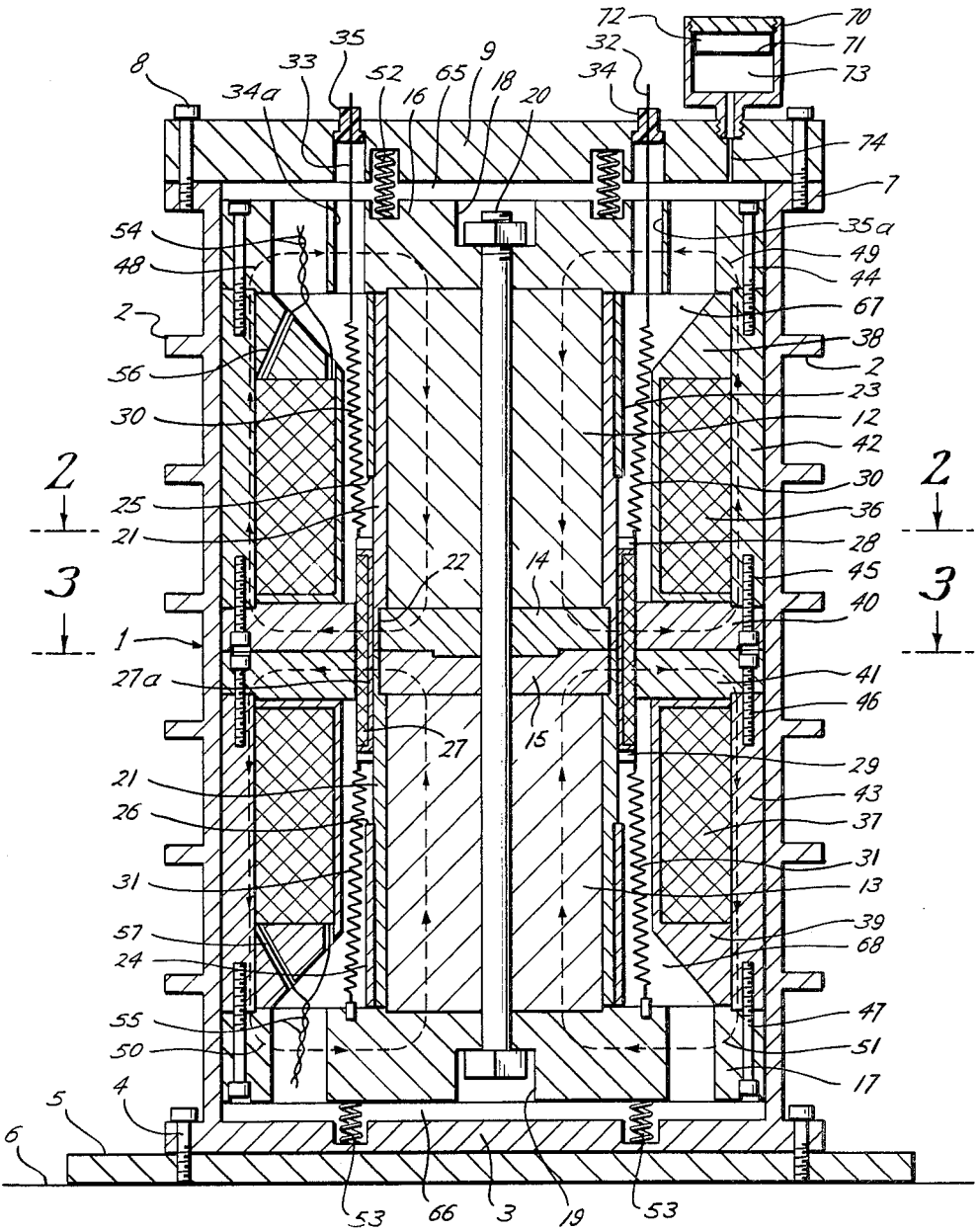

Referring to the figures, the operating mechanism is enclosed in a sealed, rigid housing 1, conveniently, cylindrical with peripheral reinforcing flanges 2. The base plate 3 at the bottom of the housing is rigidly secured by means of bolts 4 to a radiator plate 5 which is to be planted firmly on the ground 6. At the top of the casing is a flange 7 to which the top plate 9 is secured by bolts 8. Snugly but slidably received within the casing is a rigid inertia structure including a pair of aligned, preferably cylindrical, permanent magnet cores 12 and 13 separated by inner pole piece plates 14 and 15 and disposed axially within the working chamber formed by the casing. At the outer ends of the inertia structure are pole piece plates 16 and 17 having central countersinks 18 and 19 accommodating the head and nut portions of an axial securing bolt 20.

Firmly lodged about each core is a heavy sleeve 21 of copper or other highly conductive material and counterbored as at 22 for receiving one of the inner pole plates 14 and 15. The sleeves may be seated, as shown, at their opposite ends on outer pole piece plates 16 and 17. Shorter sleeves 23 and 24 are tightly lodged about the outer end portions of the heavy sleeves and form annular shoulders 25 and 26. Encompassing and slidably received on the central portions of copper sleeves 21 is a hollow, cylindrical, insulated driving coil structure 27 having end rings 28 and 29 and an internal sleeve 27a. The driving coil may be wound on a suitable insulation form with rings 28 and 29 integral with sleeve 27a. The driving coil is resiliently centered by means of tension springs 30 and 31 arranged in annular sets secured at their outer ends to outer pole piece plates 16 and 17. Certain of these springs are insulated and form lead in wires symbolized at 32 and 33. These wires extend through sealing fittings 34 and 35 secured within casing cover plate 9 and pass through orifices 34a and 35a in the outer pole piece plate 9. The driving coil may oscillate, as will be described, between opposing shoulders 25 and 26.

Secured in the inertia structure about the cores 12 and 13 and spaced radially therefrom are magnetizing coils 36 and 37 mounted between internally chamfered end rings 38 and 39 and abutting inner rings 40, 41 which, in effect, form flux carrying continuations of inner pole piece plates 14 and 15. The identical magnetizing coil subassemblies are completed by sleeves 42 and 43 of magnetic material having a close sliding fit in the side wall of casing 1 and secured to outer pole piece plates 16 and 17 and rings 40 and 41 by bolts 44 and 45, 46 and 47. The subassemblies are clamped together by previously mentioned through bolt 20 to form the rigid inertia structure. Inner pole piece plates 14 and 15, aligned rings 40 and 41, sleeves 42 and 43 and the outer pole piece plates 16 and 17 form flux paths around the core members, as represented at 48, 49, 50 and 51, as will be explained. The entire inertia structure is maintained resiliently centered by coiled compression springs 52 and 53 seated against casing bottom and top plates 3 and 9. Magnetizing coils 36 and 37, which are capable of carrying heavy currents, are provided with lead in wires 54 and 55 for a purpose to be described and wihch in FIG. 1 are shown short circuited. These wires extend through small orifices 56 and 57 in chamfered end rings 38 and 39. Optionally these magnetizing coils may be replaced by solid sleeves of copper or other heavy metal to provide both shielding from eddy currents and demagnetization, and to provide desired additional mass. The magnets are then magnetized by external electro magnets in a conventional manner well understood by those skilled in the electrical arts.

The inertia structure divides the working chamber in the casing 1 into upper and lower pressure compartments, each including a portion, as 65 and 66, between the inertia structure and casing top and bottom plates 9 and 3, and communicating portions, as 67 and 68, extending within the confines of the inertia structure and between each magnetizing coil 36 or 37 and the adjacent part of core sleeve 21. A co-axial annular gap is provided between the central part of copper sleeve 21 and rings 40 and 41. Driving coil 27 is placed snugly but slidably in this gap and normally is centered relative to the core members by tension springs 30 and 31.

A pressure accumulator device 70 is mounted on casing top plate 9 and, preferably, has a transverse diaphragm 71 forming an upper gas chamber 72 and a lower chamber 73 in communication through a small orifice 74 in top plate 9 with the working chamber within the casing.

In operation, core members 12 and 13, initially, will be magnetized by means set out above. Also, the working spaces 65, 66, 67 and 68 within the casing will be fully charged with suitable hydraulic fluid at a pressure of, say, several hundred pounds per square inch.

Thus coil 27 and permanently magnetized core members 12 and 13 form, respectively, the armature and fields of a reciprocating electric motor. Energization of the driving coil will cause it to move as a piston, relative to the permanent magnet cores 12 and 13, and the forces thereby generated in the pressure compartments will apply a strong axial force to the inertia structure. The latter moves as a piston within the casing, but in the direction opposite to that of the driving coil and to an extent proportionately less than the amplitude of driving coil movement. Electrical current, which may take the form of either a quick pulse, or a wave train, or other form, according to the type of function to be radiated, is carried to driving coil 27 by means of wires 32 and 33. It will be seen that in conformity with the principles of the hydraulic press, the total reactive force acting on the inertia mass will be related to the force acting on the driving coil according to the following formula:

$$F = f \cdot \frac{A}{a}$$

Where $f$ is the electrodynamic force acting on the driving coil; $a$ is the effective area of the driving coil exposed to the working chamber; $A$ is the area of the inertia mass exposed to the working chamber. Thus if the value $$\frac{A}{a}$$

the force acting on the inertia mass will be ten times the force applied by the driving coil. Obviously, the travel distance or amplitude, and therefore the velocity of the driving coil relative to those of the inertia mass, will be multiplied in the same ratio, thereby contributing greatly to the electrodynamic efficiency of the driving system. In transporting and handling the units, there will be large transient displacements of the inertia mass and this in turn would tend to produce corresponding excursions in the driving coil 27 and straining of its centering springs 30 and 31 were it not for limiting shoulders 25 and 26.

Since driving coil 27 is surrounded by masses of steel that form the poles of the permanent magnet, coil 27 normally will have a high inductance. This is objectionable in that it greatly reduces electrodynamic efficiency particularly when it is desired to radiate high frequencies and brief transients. It also gives rise to objectionable phase shifts and distortions of wave forms. To aid in preventing this, heavy conducting sleeves 21 are provided. These sleeves, preferably of copper, will have induced therein currents opposite in phase from the currents in the driving coil. They therefore suppress, in a large measure, the inductive component which would appear in the driving coil allowing substantial current at high frequencies to be applied to the driving coil without decreasing the efficiency thereof. The induced currents in these conducting sleeves, also, effectively prevent the current in the driving coil 27 from demagnetizing the permanent magnet cores 12 and 13. Magnetizing coils 36 and 37 may serve initially to magnetize permanent magnets 12 and 13, as explained. After such magnetization, coils 36 and 37 are short circuited, as shown. Thereafter, these coils serve a further purpose for suppressing alternating magnetic fields similar to the function of the conducting sleeve 21 and help to prevent the current in the driving coil from demagnetizing the permanent magnets.

One of the advantages of this type of radiator, in addition to its high electrodynamic efficiency, is the fact that the movement of the driving coil and, therefore, the movement of the entire inertia mass within the casing, and hence the radiated seismic waves, will be true analogs of the electric current in the driving coil. Since this current may have any desired form and character by the use of computer controls, any desired type of seismic signal can be radiated with close control of all essential elements such as amplitudes, wave lengths, phase relationships, and overall duration of the signal. Such control is very important to the implementation of many processing techniques, particularly those utilizing computers of any type.

In designing a radiator based on the principles hereinabove set out, special measures must be taken to compensate for thermal expansion of the hydraulic fluid. The coefficient of expansion of all fluids available for hydraulic operation is many times greater than the corresponding coefficients of metals available for making the housing. If the fluid chamber is filled at any particular temperature without excess pressure, then at any lower temperature there will be a partial vacuum in the chamber, resulting in loss of energy in the driving system and also objectionable distortion of the radiated signals. In order to avoid these difficulties it is necessary to maintain a positive pressure on the hydraulic fluid during all working periods. However, if this be done without special protective measures, any material rise in temperature due to climatic conditions or to the heat generated in the unit during normal operation, will result in an abnormal temperature rise that may injure the radiator. In order to avoid these difficulties, and permit the maintenance at all times of a proper pressure within predetermined limits, I make use of the automatic pressure control device 70, as illustrated in the figure. A very small orifice 74 in top plate 9 permits fluid to move very slowly in either direction between the working chamber in the housing and chamber 73. This opening is made small enough so that there will be no appreciable relief of the high speed pressure variations accompanying the normal operation of the radiator, but any steady state variations due to temperature changes, will be largely equalized by automatic changes in the sealed volume of the compressed gas in the space 70. By proper design this device can be made to maintain at all times an appropriate operating pressure within the housing of the radiator, while protecting it against any objectionable rise or fall in pressure under extreme temperature condtions. Diaphragm 71, of course, is made flexible enough to accommodate, without injury to itself, all pressure variations that may arise under operating conditions, while maintaining the gas segregated from the hydraulic fluid.

The power for driving the radiator may be derived in any of a variety of ways depending on the type of signal to be radiated. Typically the power may be taken from a conventional type of power amplifier which is governed by a function generator designed to generate the particular type of function desired. Hydraulically driven radiators and vibrators have heretofore been extensively used but they depend on the use of computer controlled valves to modulate the flow of hydraulic fluid. These valves and their controls have proved to be a constant source of trouble. In the present invention no valves are used so that a major source of trouble is eliminated.

Various features of the invention may be modified as will occur to those skilled in the art. For instance, other proportional force multiplying and amplitude reducing instrumentalities may be used, although the hydraulic linkage herein shown is exemplary for the purpose. The exclusive use of all modifications as come within the scope of the appended claims is contemplated.

I claim:

1. A seismic radiator comprising a rigid, sealed casing having a working chamber therein and a radiating plate member, an inertia member and a driving member reciprocably mounted in said chamber and normally spaced from said radiating member, a hydraulic charge in said chamber and means for actuating said driving member for transmitting impulses through said charge to said inertia and radiating members.

2. A seismic radiator as described in claim 1 in which said inertia member incorporates magnetic flux producing structure and said driving member incorporates electrical conductor means and further including means for electrically energizing said conductor means to cause relative motion of said driving and inertia members by motor action.

3. A seismic radiator as described in claim 2 in which substantially different areas of said driving and inertia members are exposed to the hydraulic charge in said working chamber for causing proportionately varied movement of said inertia member in response to movement of said driving member.

4. A seismic radiator comprising a rigid, sealed casing forming a working chamber therein and having a bottom plate and a top plate, a hydraulic charge in said chamber, an inertia member movably mounted in said chamber, said chamber having parts extending, respectively, between said casing top and bottom plates and said inertia member, magnetic flux producing means in said inertia member adjacent said chamber parts, a conductor equipped driving member reciprocably mounted in said inertia member adjacent said flux producing means and projecting into said chamber parts, and means for electrically energizing said driving member to cause relative motion between said driving and inertia members, the area of said driving member exposed to said working chamber being substantially less than the corresponding area of said inertia member whereby motion of said driving member is proportionately greater in amplitude and velocity than the resultant motion of said inertia member and the reactive impulse applied to said casing bottom plate.

5. A seismic radiator as described in claim 4 in which said inertia member includes a magnetizable core portion, coil means mounted about and spaced from said core portion, and means for electrically energizing said coil means, said driving member being located in the space between said core portion and said coil means, and said coil means being adapted for magnetizing said core portion and when short circuited for minimizing inductance created by said driving member.

6. A seismic radiator comprising a rigid, sealed casing forming a working chamber therein, and having a bottom wall and a top wall, an inertia structure reciprocable in said chamber and dividing said chamber into individual compartments, respectively, adjacent said casing bottom and top walls, said inertia structure having a core member, a driving member movably mounted adjacent and extending along said core member and into each of said compartments, motor field and armature means incorporated with said core and driving members, and means for electrically energizing said motor means to cause movement of said driving member relative to said inertia member, each movement of said driving member, alternately increasing and decreasing the volumes of said compartments and thereby shifting said inertia structure in said working chamber and applying a reactive impulse to said casing bottom wall.

7. A seismic radiator as described in claim 6 in which the area of said driving member exposed to said working chamber is substantially less than the corresponding area of said inertia member whereby the amplitude of reactive movement of said inertia member and the concomitant impulse applied to said bottom wall is substantially less than that of the driving member movement.

8. A seismic radiator as described in claim 6 further including an induction damping element mounted adjacent said core and driving members whereby the movements of said driving member and said inertia structure and the reactive impulse applied to said casing bottom wall are substantial analogs of the electrical energization applied to said motor means.

9. A seismic radiator comprising a radiator member, an electrodynamic driver member mounted adjacent said radiator member, fluid charged chamber means between said members, and a conducting shield provided adjacent said driver member for minimizing inductance thereof, both of said members being exposed to the fluid in said chamber means whereby motion of said driver member will be transmitted through said fluid to said radiator member and the reactive impulses of said radiator member will be substantial analogs of the electrical energization applied to said driver member.

10. A seismic radiator comprising a casing forming a working chamber and having bottom and top walls, inertia structure reciprocable in said chamber and dividing the same into individual pressure compartments, respectively, adjacent said casing walls, said structure including magnetic core means disposed axially of said chamber, pole piece elements on said core means, and flux carrying structure between said pole piece plates, a hollow, cylindrical driving member reciprocably encompassing said core means intermediately of said casing top and bottom plates and exposed oppositely to said pressure compartments, said driving member and core means incorporating electric motor field and armature means, means yieldably fixing said driving member relative to said core means, means for electrically energizing said driving member for causing relative movement of the same and said inertia structure and resultant reactive shifting of said casing, the areas of said driving member exposed to said pressure compartments being substantially less than the corresponding areas of said inertia structure and said casing top and bottom walls whereby the amplitude of movement of said driving member will be substantially greater than the amplitude of reactive movement of said inertia member and said casing walls and the force applied to said casing bottom wall will be proportionately greater than the force exerted by said driving member.

References Cited by the Examiner

UNITED STATES PATENTS

| | | | |
|---|---|---|---|
| 2,913,701 | 11/1959 | Wachholz | 340—17 |
| 3,004,178 | 10/1961 | Efromson | 310—11 |

BENJAMIN A. BORCHELT, *Primary Examiner.*

P. A. SHANLEY, *Assistant Examiner.*